United States Patent [19]

Enjolras

[11] 4,328,827
[45] May 11, 1982

[54] VALVE WITH AN AUTOMATIC BLEED DEVICE

[75] Inventor: Hubert Enjolras, Domene, France

[73] Assignee: Commissariat a l'Energie Atomique, Paris, France

[21] Appl. No.: 163,070

[22] Filed: Jun. 26, 1980

[30] Foreign Application Priority Data

Jun. 28, 1979 [FR] France .............................. 79 16738

[51] Int. Cl.³ ............................................ F16K 15/02
[52] U.S. Cl. ............................ 137/512.2; 137/513.3
[58] Field of Search ............... 137/512.2, 513.3, 513.5, 137/513.7

[56] References Cited

U.S. PATENT DOCUMENTS

| | | | |
|---|---|---|---|
| 807,269 | 12/1905 | Hildebrand | 137/512.2 |
| 2,575,944 | 11/1951 | Conner | 137/512.2 X |
| 2,895,504 | 7/1959 | Lederer | 137/539 |
| 3,193,988 | 7/1965 | Kudlaty | 137/493.4 X |
| 3,749,121 | 7/1973 | Frankewich | 137/512.2 |
| 3,856,041 | 12/1974 | Cryder et al. | 137/512.2 X |

*Primary Examiner*—William R. Cline
*Attorney, Agent, or Firm*—Michael N. Meller; Anthony H. Handal

[57] ABSTRACT

This invention relates to a safety-valve for restricting the pressure within a fluid-containing enclosure. It comprises a flap firmly applied against the seal of such an enclosure by means of an adjustable spring, whereby there is generated in said enclosure an overpressure adapted to cause said flap to rise and, accordingly to cause fluid to be vented from said enclosure, in which said flap is provided with a nozzle adapted to be obturated by means of a needle firmly applied against said nozzle by a piston driven by a balancing spring, the force of which can be adjusted by means of a screw with the annular clearance between said needle and the body of said flap forming a calibrated orifice or port.

1 Claim, 1 Drawing Figure

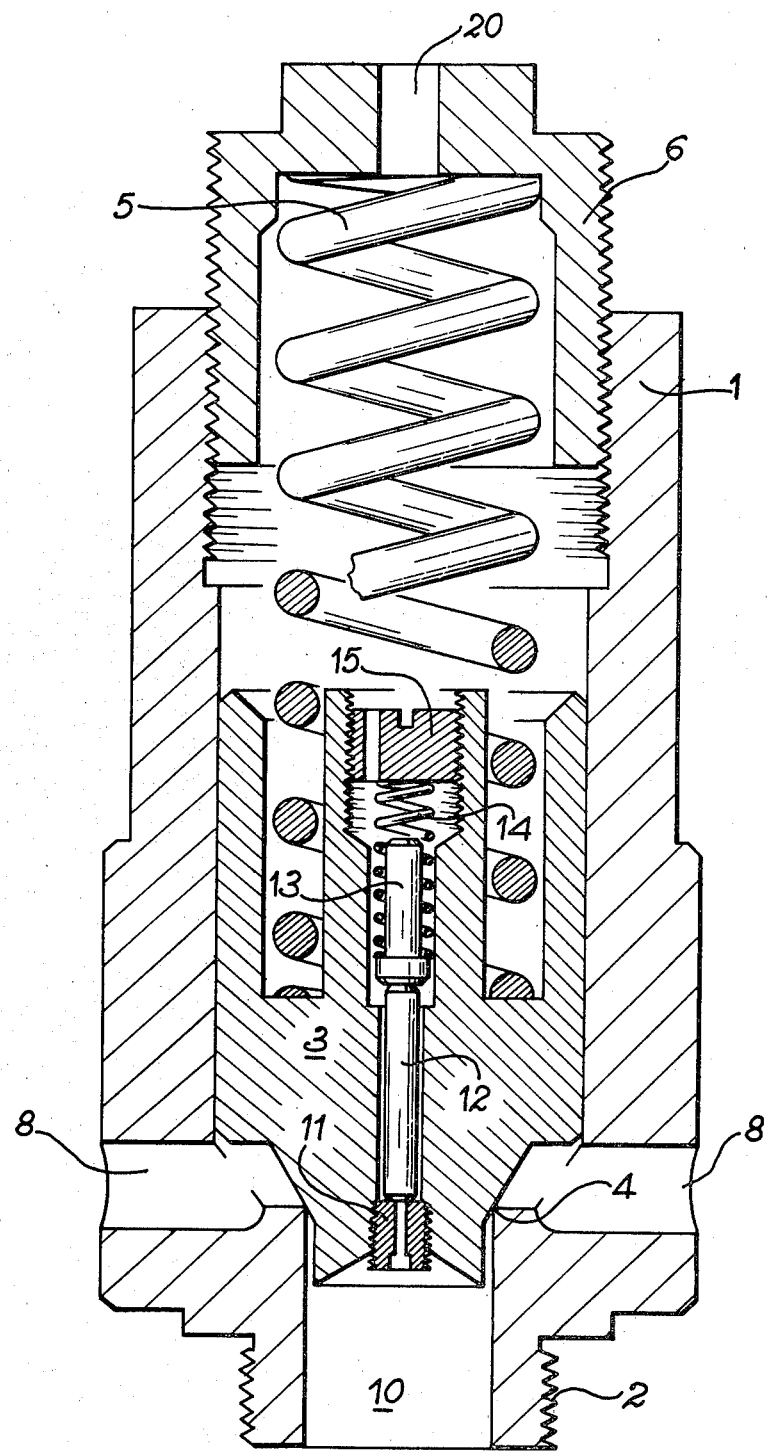

VALVE WITH AN AUTOMATIC BLEED DEVICE

BACKGROUND OF THE INVENTION

1. Field of the Invention

The present invention relates to a valve comprising an automatic bleed device. It has an application in restricting the pressure within an enclosure containing an incompressible fluid, in particular when said enclosure is pressurized by means of a volumetric pump.

2. Description of the Prior Art

Safety valves of the so-called "relief or over-pressure type" are known. Such valves are provided with a ball adapted to abturate an orifice, or port, said ball being maintained on its seat by means of a spring-biassed piston. The force exerted by said spring can be controlled through a screw for adjusting its compression. It is thus possible to adjust the minimum pressure above which the ball is to be raised from its seat. Such a valve is mounted on the wall of an enclosure containing a pressurized fluid. Whenever the pressure within said enclosure rises beyond a given amount, the ball rises and the fluid contained in said enclosure flows outedly therefrom. In this manner any risks of disturbance or failure are avoided such as might occur in case of overpressure in the enclosure in question.

Not unfrequently, however gas bubbles (e.g. air-bubbles) are to be found in the fluid contained in said enclosure; that is why on the enclosure containing the pressurized fluid, an automatic bleed device is usually mounted in addition to the conventional safety valve. The function of the latter is due to vent from the enclosure a certain amount of fluid, e.g. oil, adapted to drive therewith the gas contained in said enclosure. Quite obviously the selection of the position of said automatic bleed device is important. Said device, indeed, should be installed in the topmost portion of the enclosure, where the gas contained in the fluid tends to gather.

Such an automatic bleed device can comprise a body fixed to the enclosure wall, e.g., by means of screws, said body containing an inlet nozzle obturated by means of a needle applied against said nozzle by means of a piston driven through a balancing spring. The pressure exerted by said balancing spring on said nozzle-inlet-obturating needle can be controlled by means of an adjusting screw. It is thus possible to adjust the force exerted by such a spring in such a manner that, through the pumping pulses, said needles thus balanced by the spring-driven balancing piston be imparted an alternating movement and allow the gas-fluid emulsion to flow through the annular clearance between said needle and said body of the automatic bleed device.

In the long run, however, the gas tends to accumulate at the safety-valve inlet, thus forming a compressible cushion, which is a nuisance, especially if the installation comprises a volumetric pump, e.g. a piston or a diaphragm-pump, the volumetric efficiency is decreased by such a cushion. Said compressible-cushion-forming gas can be vented from the enclosure only provided the hydraulic nominal pressure is higher than the safety-valve calibration-pressure, which in fact rarely occurs. This is the reason why the safety valve should be calibrated by hand whenever said gas-cushion becomes too thick thus causing the pump flow-rate to decrease to an overly large extent.

A further drawback of such a device lies in the fact that it requires the installation of two separate components and of two ducts for insuring the return of oil into the tank or cistern, from the inside of which the fluid is sucked by the pump, thus increasing the cost-price and bulkiness of said device.

SUMMARY OF THE INVENTION

The purpose of the present invention is therefore to provide a safety-valve adapted to obviate the above drawbacks.

Such a valve for restricting the pressure within a fluid-containing enclosure is of the type comprising a flap firmly applied against the seat thereof by means of an adjustable spring, the arrangment being such that it gives rise to an overpressure within the enclosure said overpressure, in its turn, causing said flap to rise and, therefore, inducing fluid to flow from said enclosure. Such a valve is characterized in that said flap is provided with a device for automatically bleeding the enclosure.

Preferably, said automatic bleed device is constituted by a nozzle obturated by means of a needle firmly applied against said nozzle by means of a piston driven through a balancing spring, the force of which can be adjusted through a screw, the annular clearance between said needle and said flap body forming a calibrated orifice, or port.

Other features and advantages of the present invention will appear from the following description, given merely by way of explanation, with respect to the enclosed FIGURE, on which is shown, in cross-section, an embodiment of the automatic-bleed safety-valve according to the present invention.

BRIEF DESCRIPTION OF THE DRAWINGS

In said FIGURE, reference number 1 designate the valve-body. Said body 1 is externally threaded, as shown at 2, so that it can be threadedly engaged into the wall of an enclosure containing a fluid pressurized by means of a pump, e.g. a volumetric pump. Flap 3 is firmly applied against seat 4 by means of a calibrating spring 5. The force exerted on flap 3 by said calibrating spring 5 can be adjusted by means of a screw 6. It is thus possible to adjust the pressure value beyond which flap 3 starts rising from its seat 4. Accordingly the safety-valve according to the present invention is adapted to restrict the pressure within the enclosure on the wall of which said safety valve is mounted. Whenever the pressure rises beyond said minimum value, the fluid flows from said enclosure through both orifices 8 in the body 1 of said valve, then said fluid flows back into the tank, or cistern, inside which the pump is caused to suck.

However, in the long run, the gas present in the fluid filling the enclosure is caused to gather at the safety-valve inlet 10, the so-called "degassing-chamber". Accordingly, the present invention provides an automatic-bleed device mounted on flap 3 of said safety-valve. Said automatic bleed device contains an inlet nozzle 11 obturated by means of needle 12. Said needle is firmly applied against the orifice or port, of said nozzle by means of a piston 13 driven by a balancing spring 14. The force of said balancing spring 14 can be adjusted by means of a screw 15. A calibrated orifice is constituted by the annular clearance between said needle 12 and the edge of flap 3. Therefore, through the pumping pulses, said needle 12 thus balanced by piston 13 and spring 14 is given an alternating movement and permits the gas-fluid emulsion contained in degassing-chamber 10 to flow through said annular clearance between said needle and said flap 3. The fluid is driven towards the tank, or cistern, via typing connected to orifice 20 of said safety-valve.

An important feature of the safety-valve according to the present invention therefore lies in the fact that the chamber for degassing the automatic bleed device and the pressure limiting device form but one single chamber. Accordingly, the gas does not tend to accumulate to the point of genereting a compressible cushion and is immediately vented by the automatic bleed device mounted on flap 3 of the valve according to the present invention. Thus are avoided the drawback resulting from the presence of such a compressible gas-cushion, such a cushion, as explained above, being adapted to disturb the volumetric pump flow-rate and, therefore, to decrease the efficiency thereof. The absence of such a compressible gas cushion permits to dispense with the periodical manual operations normally carried out for bleeding the safety valves, such operations being compulsory in the case of the prior art valves. The volumetric pump regime is thus stabilized.

An other advantageous feature of the device according to the present invention lies in the fact that the automatic bleed parts and the pressure limiting parts require but a single fixing step instead of two, thus simplifying the mounting operations. In addition, the same duct is used for returning to the tank, or cistern, the exhaust fluid vented from the enclosure through the safety valve on the one hand, and the bleed fluid vented from said enclosure via the automatic bleed device, on the other hand, said latter gas being in emulsion with the gas present in degassing chamber 10. These two fluids are recovered in the housing protecting the valve according to the present invention.

Quite obviously, the position of the safety valve according to the invention, though not strictly critical is not immaterial; just like the bleed devices of the prior art, the safety valve according to the present invention must be mounted at the topmost point of the enclosure in order to fulfill one of the functions thereof correctly, viz. venting the gas present in the fluid.

It should be also noted that the valve according to the present invention is not restricted as regards pressure. In order to obtain a given value of the maximum admissible pressure within the hydraulic circuit in which said valve is mounted, it is sufficient to carry out an appropriate selection of the calibrating spring 5 and of the balancing spring 14, as well as of the calibrated leak provided by the annular clearance between needle 12 and the body of flap 3.

What is claimed is:

1. A safety valve for an incompressible fluid-containing enclosure, comprising a longitudinal body fixed to the wall of such enclosure, an internal valve chamber with valve member means sliding within said chamber, an inlet in said body connected to the interior of said chamber and forming a seat for said valve member, with two openings in said body, said first opening being located adjacent the valve seat, while the other opening is located on far end of body, said valve member means being positioned in abutting relationship with said seat in said chamber, calibrating spring means within said chamber acting against said valve member at one end of said spring means, said valve-member being provided with a nozzle therethrough, needle means located within an annular cylindrical cavity within said valve body, said needle being firmly applied against said nozzle by a piston abutting against said needle, a balancing spring means positioned to press on piston screw means for adjusting the force of said balancing spring, said needle defining with said cylindrical cavity an annular clearance of constant cross-section and valve member forming a calibrated orifice or port.

* * * * *